Nov. 6, 1928.
C. F. KETTERING
1,690,341
AIR CLEANER
Filed Nov. 25, 1925
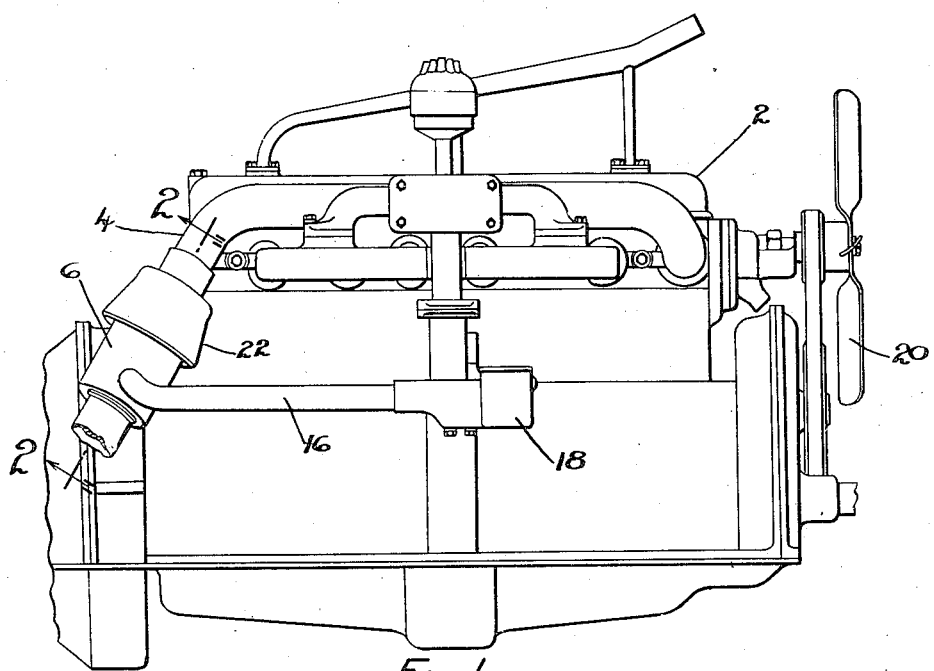
Fig. 1
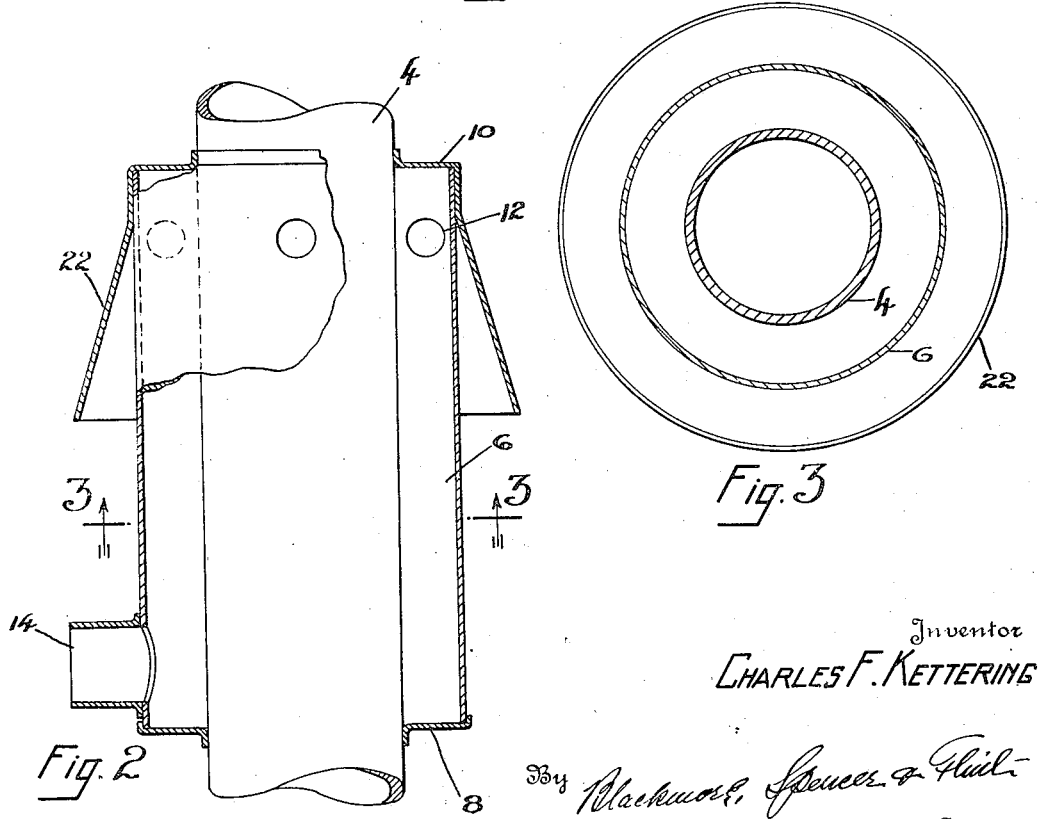
Fig. 2
Fig. 3
Inventor
CHARLES F. KETTERING
By Blackmore, Spencer & Fluili
Attorneys.

Patented Nov. 6, 1928.

1,690,341

UNITED STATES PATENT OFFICE.

CHARLES F. KETTERING, OF DAYTON, OHIO, ASSIGNOR TO GENERAL MOTORS RESEARCH CORPORATION, OF DETROIT MICHIGAN, A CORPORATION OF DELAWARE.

AIR CLEANER.

Application filed November 25, 1925. Serial No. 71,367.

It is the object of this invention to provide a practical air cleaner which may be applied to the air intake line of an internal combustion engine at very slight cost. The cleaner which I have devised is of the well known type in which separation of dust particles is effected by taking advantage of their greater inertia as compared with the inertia of the molecules composing the air stream. This inertia separation is accomplished by locating the cleaner in the path of a strong current of air, such as is supplied by the usual cooling fan, or by the motion of the car, or by both these agencies.

In the drawing I have shown my invention applied to the Chevrolet engine, although it is obvious that the invention may be utilized in connection with other well known automobile power plants. The Chevrolet engine is provided with a rearwardly extending exhaust conduit around which is secured a casing serving as a stove or heater for the carburetor air supply. This casing is provided with openings at the end nearer the fan through which air enters the casing where it is heated by contact with the hot exhaust conduit and is then conducted to the carburetor. My invention consists in applying a baffle over the air intake openings, the baffle being so constructed as to prevent direct entrance of the air currents caused by the fan as well as by the motion of the vehicle. A cleaner such as described has been found to possess an efficiency of between 40% and 50% and can be supplied to the engine at very slight expense.

In the drawings:

Figure 1 is a side elevation of an automobile power plant with my invention applied thereto.

Figure 2 is a view, partly in section, showing the details of construction of the cleaner.

Figure 3 is a section on line 3—3 of Figure 2.

The reference character 2 indicates an automobile power plant having an exhaust conduit indicated at 4 extending downwardly and rearwardly from the exhaust manifold. This is a feature of the present Chevrolet engine. The engine is provided with a heater or stove comprising a cylindrical casing 6 surrounding the exhaust conduit, the lower end of the casing being closed by an annular cap indicated at 8, and the upper end of the casing being closed by an annular cap indicated at 10. Apertures 12 are provided in the upper portion of the cylindrical member 6 and the lower portion of the member 6 is provided with an outlet indicated at 14 connected by conduit 16 to the customary carburetor 18. In the actual Chevrolet construction the carburetor 18 is located on the opposite side of the engine and the conduit 16 crosses the engine and extends forward to the carburetor, but for purposes of illustration I have shown the carburetor 18 on the same side of the engine as the exhaust conduit 4. It is to be understood, however, that the casing 6 extends outwardly from the side of the engine and is freely exposed to the full strength of the air blast from the fan 20 as well as that resulting from the motion of the vehicle.

My invention consists in the application of a baffle which prevents the direct entrance of air currents into the openings 12 and thus effects a selection of clean air for the carburetor, the particles of dust carried by the air stream being carried past the baffle by virtue of their greater inertia and thus being effectively prevented from entering the casing 6. This baffle I have indicated by the reference character 22. In the preferred form it is annular in shape and is outwardly flared to shield the openings 12. While the baffle may be separately secured to the casing 6, I have preferred to form it in one piece with the top 10 of the casing, this for convenience and economy in manufacture.

The operation of the device should be manifest from the foregoing. The cleaner has been found to be effective and its cheapness and simplicity render it available for use upon cars in which costs are held to very close limits.

I claim:

1. The combination of an internal combustion engine having the usual carburetor, cooling fan, and exhaust conduit, a portion of said conduit being exposed to the blast of the fan and extending rearwardly therefrom, a casing surrounding said conduit, said casing having the end adjacent the fan closed, an opening in the casing adjacent the closed end, an annular shield extending over the opening, the shield preventing the direct entrance of air into the casing, and means for conducting air from said casing into the carburetor.

2. In the structure as defined by claim 1, said shield comprising an outwardly flaring annulus surrounding the casing.

In testimony whereof I affix my signature.

CHARLES F. KETTERING.